Aug. 17, 1954         R. J. JOHNSON              2,686,573
                      CYCLONE SEPARATOR
                    Filed Feb. 28, 1949
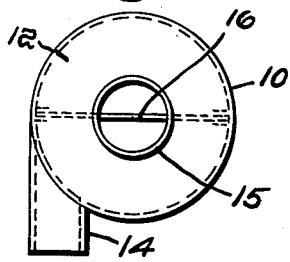
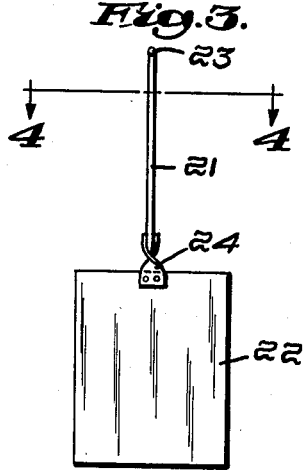
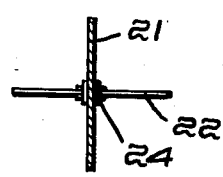
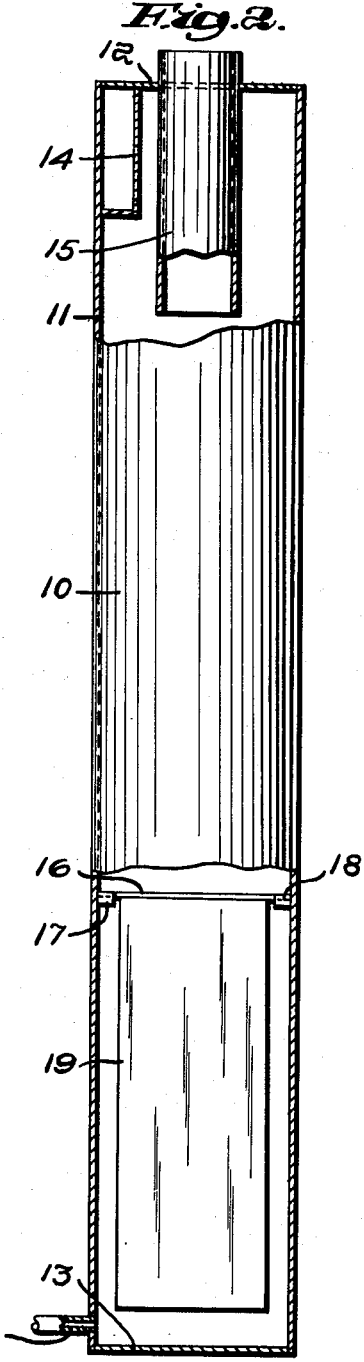
Inventor:
Robert J. Johnson,
by Kern E. Follers
Attorney Patented Aug. 17, 1954

2,686,573

UNITED STATES PATENT OFFICE 2,686,573

CYCLONE SEPARATOR

Robert J. Johnson, Boston, Mass., assignor to Monsanto Chemical Company, St. Louis, Mo., a corporation of Delaware Application February 28, 1949, Serial No. 78,754

6 Claims. (Cl. 183—87)

The present invention relates to an improved cyclone separator and particularly to an improved cyclone separator for separating from an air or gas stream particles of suspended material which tend to stick to surfaces upon which they impinge.

In separating solid particles of phthalic anhydride and similar materials from an air or gas stream in order to recover the same or to prevent contamination of the atmosphere, it has been found that cyclone separators with conical bottoms are unsatisfactory for the reason that the particles tend to build up on and bridge across the walls of the conical portion thus necessitating frequent shut-downs for cleaning. Moreover, the build up particles on the conical walls of such separators results in a decreased collection efficiency. Other cyclone separators which contain a complicated system of baffles, vanes and the like are also unsuitable for use in this connection because of the clogging of the passageway through which the particles normally settle.

It is accordingly one object of the present invention to provide a simple cyclone separator which is capable of efficiently separating solid particles such as solid particles of phthalic anhydride or of other materials which tend to stick to surfaces on which they impinge from a gas or air stream without the necessity for periodically cleaning the separator.

A further object of this invention is to provide a simple cyclone separator for use in separating solid particles of phthalic anhydride from a gas or air stream and which allows the removal of phthalic anhydride from the separator without the loss of appreciable amounts of phthalic anhydride vapor in the exit gas stream.

Still further objects and advantages of this invention will appear from the following description when taken in connection with the accompanying drawing and the appended claims.

The apparatus, described in greater detail hereinafter, comprises, in general, a cylindrically shaped container which is provided with tangential inlet means for supplying a gas or air stream containing solid particles of material to the container, outlet means for allowing the gas or air stream to escape from the container after the solid particles of material have been separated from the air stream and baffling means located at a predetermined distance from the top of the container to divert the downwardly spiraling gas stream centrally upward and to substantially prevent the spiraling gas stream from stirring up particles of settled material at the bottom of the container and conveying such particles out of the container. The baffling means, as will be seen, are so constructed and designed so as to substantially prevent clogging or bridging over of the passageways adjacent thereto.

In the drawing, in which like numbers represent identical parts:

Figure 1 is a top view of one specific embodiment of a cyclone separator constructed in accordance with the present invention;

Figure 2 is a side elevation of the cyclone separator illustrated in Figure 1, the separator being partly broken away to show interior construction;

Figure 3 is a side elevation of a preferred embodiment of a vertical baffle employed in such cyclone separator; and Figure 4 is a top sectional view of the vertical baffle taken along line 4—4 of Figure 3.

Referring specifically to Figures 1 and 2, 10 represents a closed cylindrical container made up of side walls 11, a top 12 and a bottom 13. A gas or air stream is supplied by means of any suitable blower or other device (not shown) to the cylindrical container 10 through a tangentially mounted inlet pipe 14, which is preferably located at the uppermost part of the container, as illustrated. The spent gases leave the cylindrical container by way of outlet pipe 15, which is illustrated partially in section in Figure 2. Pipe 15 is preferably located so that its longitudinal axis coincides with the longitudinal axis of the cylindrical container.

Numeral 16 represents a support rod which is freely suspended across the diameter of the container in brackets 17 and 18, which are fastened to the side wall of the container. Vertical baffle plate 19 is welded or otherwise fastened to support rod 16 and is spaced from the side walls of the container and preferably from the bottom of the container. This baffle is preferably constructed of sheet steel or other suitable sheet metal. Eleven gauge steel sheet has been found to be suitable for this purpose. The minimum distance from the top of the cylindrical container to the top of the vertical baffle 19 is critical and depends upon the diameter of the container, the volume and velocity of the gas stream entering the container and the nature of the material which it is desired to remove from the incoming gas or air stream. In general, the top of the vertical baffle should be located at a distance from the top of the container which is sufficient to enable efficient separation of the particles of material from the gas stream without fostering clogging of the passageway between the baffle and the walls of the container, and without stirring up the particles which have settled at the bottom of the container. In removing such particles from an air or gas stream which is being supplied to the container, it is essential to locate the top of the vertical baffle plate from the top of the container by a distance equal to at least twice, preferably three times, the diameter of the container. The maximum distance of the top of the baffle from the top of the container may be as much as 5 to 6 times the diameter of the container especially when the volumetric velocity of the entering gas stream is high.

The length of the vertical baffle plate may be varied considerably depending upon the conditions of operation and the size of the cylindrical container. In general, its length is equal to ½ to 2 times the diameter of the container, but may be greater or less in some instances. It is preferred, however to use a vertical baffle plate which is longer than the diameter of the container.

The distance between the vertical edges of the baffle plate and the side walls of the cylindrical container may be varied to some extent depending upon the diameter of the container and the conditions of operation. Since the function of the vertical baffle is to prevent the outer vortex of the rotating gas stream from reaching the bottom of the container and stirring up the particles of material which have already settled or vapors from such materials, it is essential that the vertical edges of the baffle be sufficiently close to the side walls of the container to effectively brake the velocity of the rotating gas stream. This braking effect should be sufficient to decrease the velocity of the gas stream and thus enable the spent gases to rise before they reach the bottom of the container. This may be accomplished in general by spacing the vertical edge of the baffle between about 1 to 4 inches from the side walls of the container. If the spacing is not sufficient the particles of material tend to collect in the space between the edge of the baffle and the side wall of the container and this may lead eventually to complete clogging of the space between the baffle plate and the side wall of the container.

The vertical baffle plate is preferably spaced from the bottom of the container especially when it is desired to remove the settled material from the container continuously. Thus, in separating and collecting phthalic anhydride particles, it is often desirable, because of the low melting point of the anhydride, to heat the bottom and lower side walls of the container by suitable means and melt the settled material so that it can be drawn off through an overflow line 20. With this type of arrangement it is preferred to space the bottom of vertical baffle from the bottom of the container so that the lower horizontal edge of the baffle is above the level of the melt. This prevents possible bridging of the settled material between the top layer of the melt and the bottom edge of the baffle.

If it is desired to collect the particles of settled material separately from the separator, it is possible to employ a container without a bottom and use a collecting tank or other suitable collecting means connected directly to the bottom end of container 10. Such tank or collecting means may be fastened to container 10 permanently or temporarily as desired.

A preferred embodiment of vertical baffle for use in the apparatus of the present invention is illustrated in Figures 3 and 4 and consists of two vertical plates 21 and 22 which are mounted at right angles to each other. The vertical center lines of plates 21 and 22 are substantially coincident so that the vertical edges of the plates will be spaced substantially equidistant from the side walls of the container when the entire baffle assembly is positioned therein. Plate 21 is welded to the support rod 23 by which it is suspended and held in position in container 10. Plate 22 is suspended from and fastened to plate 21 by metal straps 24, the straps being riveted, welded or otherwise fastened to plates 21 and 22. It is obvious that various combinations of two vertical baffle plates may be used which can be positioned at various angles and which will vary in effect between a single baffle plate as illustrated in Figures 1 and 2, and two baffle plates mounted at right angles as illustrated in Figures 3 and 4. For example, two vertical plates may be mounted or joined together one above the other so that they are in the same vertical plane, or the smallest angle between the vertical plane of each plate may vary up to 90°. Moreover, it is possible to use multiple vertical baffle plates, that is, more than two vertical baffle plates arranged one above the other at various angles to each other.

The vertical baffle illustrated in Figures 3 and 4 is preferred because it exerts a particularly effective braking effect on the downwardly rotating gas stream and substantially prevents the gas stream from descending to the bottom of the container and stirring up the settled material or from taking up vapors from the melted material if such an arrangement is employed.

The following specific example illustrates the result obtained in removing particles of phthalic anhydride from an air stream by using a specific cyclone separator constructed in accordance with this invention under certain specific operating conditions.

*Example*

In this example container 10 was 19 feet and 6 inches high (internally) and had an internal diameter of 3 feet. The air inlet 14 was 8 inches by 2 feet and the air outlet pipe 15 was 4 feet long and had a diameter of 1 foot and 3 inches. It was equipped with a vertical baffle as illustrated in Figures 3 and 4. Plates 21 and 22 were constructed of 11 gauge steel sheet and were each 2 feet 4 inches wide and 3 feet high. Plate 22 was suspended 4 inches below plate 21. Plate 21 was welded to support rod 23 which was freely supported from the inside wall of container 10, as illustrated, so that the bottom edge of plate 22 was suspended about 8 inches above the bottom of container 10.

A gas stream (4200 cubic feet per minute at standard conditions) at a temperature of 85° C. and 2 inches mercury gauge pressure, and containing 6.3 pounds per minute of suspended phthalic anhydride particles or dust, was continuously supplied to inlet pipe 14. The phthalic anhydride particles were separated and collected in container 10 at the rate of 6 pounds per minute. The recovery efficiency was 95%. The apparatus operated satisfactorily without clogging the settling passageways.

When the bottom portion of container 10 was heated above the melting point of the anhydride, for example by steam coils, it was found to be possible to remove the collected phthalic anhydride continuously from the container through an outlet pipe 20 in the form of a melt. Under these conditions the separating and collecting efficiency was approximately 95%. Moreover, it was possible to use the apparatus for a long period of time before cleaning was necessary.

A similar experiment was conducted in a simple (unbaffled) cyclone separator having a conical bottom, a diameter of 3 feet and an overall length of 15 feet. It was found that the conical portion of this equipment became clogged up after operating for 16 to 32 hours, and it was necessary to clean out the cone before continuing the operation.

It is not intended that the apparatus described in this invention be limited to any particular dimensions or to any particular operating conditions, for example, such as those illustrated in the above example. Various changes and modifications can be made in the apparatus described as will be apparent to those skilled in the art, and it is intended that the invention be limited only by the scope of the appended claims.

What is claimed is:

1. An apparatus for separating from a gas stream particles of suspended material which tend to stick to surfaces on which they impinge, comprising essentially a vertical cylindrical container, an inlet pipe for said gas stream opening into the upper portion of said container and mounted tangentially on the side wall thereof, a vertical baffle suspended in said container and spaced from the vertical side walls of said container and consisting of two vertical plates mounted one above the other and at right angles to each other, the top of said baffle being spaced from the top of said container by a distance at least equal to twice the diameter of said container, said vertical baffle being the only baffling means within said container means for allowing said gas to escape from said container and means for removing collected material from said container.

2. An apparatus for separating from a gas stream particles of suspended phthalic anhydride, comprising essentially a vertical cylindrical container, an inlet pipe for said gas stream opening into the top portion of said container and mounted tangentially to the side wall thereof, a gas outlet pipe positioned centrally at the top of said container, a vertical baffle suspended in said container and spaced from the vertical side walls and bottom thereof and consisting of two vertical plates mounted one above the other and at right angles to each other, the top of said baffle being spaced from the top of said container by a distance at least equal to three times the diameter of said container, said vertical baffle being the only baffling means within said container and means at the bottom portion of said container for removing phthalic anhydride therefrom.

3. An apparatus for separating from a gas stream particles of suspended material which tend to stick to surfaces on which they impinge, comprising essentially a vertical cylindrical container, an inlet pipe for said gas stream opening into the top portion of said container and mounted tangentially on the side wall thereof, a vertical baffle suspended in said container comprising at least one vertical plate, said vertical baffle being spaced from the vertical side walls of said container and being the only baffling means within said container, the top of said baffle being spaced from the top of said container by a distance at least equal to twice the diameter of said container, means for allowing said gas to escape from said container, and means for collecting said material.

4. An apparatus for separating particles of phthalic anhydride from a gas stream in which such particles are suspended, comprising essentially a vertical cylindrical casing the inner walls of which are free of baffling means, an inlet pipe for said gas stream opening into the top portion of said casing and mounted tangentially on the side wall thereof, a gas outlet pipe positioned in the top portion of said casing, a vertical baffle suspended in said casing and spaced from the side walls and bottom thereof and consisting of one vertical plate, said baffle being the only baffling means within said casing, the top of said vertical baffle being spaced from the top of said container by a distance at least equal to three times the inside diameter of said casing, and means at the bottom portion of said casing for collecting said phthalic anhydride.

5. An apparatus for separating particles of phthalic anhydride from a gas stream in which such particles are suspended, comprising essentially a vertical cylindrical container having a substantially flat bottom, an inlet pipe for said gas stream opening into the uppermost portion of said container and mounted tangentially to the side wall thereof, a gas outlet pipe positioned centrally in the top portion of said container, a vertical baffle suspended in said container and spaced from the bottom thereof and also being spaced from the vertical side walls of said container a distance of from about 1 to 4 inches, the top of said baffle being joined to a bar each end of which is supported in a member fastened to the side walls of said container, said bar being removable from said members, the top of said baffle being spaced from the top of said container by a distance equal to from 2 to 6 times the diameter of said container, said vertical baffle being the only baffling means in said container, means for heating the bottom and lower portion of said container to melt phthalic anhydride collecting in the bottom of said container, and means for removing molten phthalic anhydride from the bottom portion of said container and below said vertical baffle.

6. An apparatus for separating from a gas stream particles of suspended material which tend to stick to surfaces on which they impinge, comprising essentially a vertical cylindrical container, an inlet pipe for said gas stream opening into the upper portion of said container and mounted tangentially on the side wall thereof, a vertical baffle suspended in said container and spaced from the vertical side walls thereof and consisting of a plurality of vertical plates mounted one above the other, the top of said vertical baffle being spaced from the top of said container by a distance at least equal to twice the diameter of said container, said vertical baffle being the only baffling means within said container, means for allowing said gas to escape from said container and means for collecting said material.

References Cited in the file of this patent

UNITED STATES PATENTS

| Number | Name | Date |
|---|---|---|
| 1,066,704 | Brassert | July 8, 1913 |
| 1,600,762 | Hawley | Sept. 21, 1926 |
| 1,723,428 | Kamrath | Aug. 6, 1929 |
| 2,010,435 | Matheson | Aug. 6, 1935 |
| 2,093,994 | Blom | Sept. 28, 1937 |

FOREIGN PATENTS

| Number | Country | Date |
|---|---|---|
| 465,897 | Great Britain | May 14, 1937 |
| 482,594 | Great Britain | Apr. 1, 1938 |
| 115,239 | Australia | May 27, 1942 |